United States Patent [19]

Carson

[11] 4,428,202
[45] Jan. 31, 1984

[54] ELECTRICAL POWER GENERATION BY FRACTIONATION COLUMN REBOILER

[75] Inventor: Don B. Carson, Mt. Prospect, Ill.

[73] Assignee: UOP Inc., Des Plaines, Ill.

[21] Appl. No.: 394,374

[22] Filed: Jul. 1, 1982

[51] Int. Cl.³ .............................................. F01K 17/00
[52] U.S. Cl. ........................................ 60/648; 60/651;
203/DIG. 20; 203/DIG. 25; 208/353
[58] Field of Search ................. 60/648, 651, 671, 676;
203/DIG. 20, DIG. 25; 208/353, 365

[56] References Cited

U.S. PATENT DOCUMENTS 2,775,103 12/1956 Koble et al. .................... 208/353 X
3,032,482 5/1962 Shoemaker ................. 203/DIG. 20
4,109,469 8/1978 Carson ................................... 60/676

*Primary Examiner*—Allen M. Ostrager
*Assistant Examiner*—Stephen F. Husar
*Attorney, Agent, or Firm*—James R. Hoatson, Jr.; John F. Spears, Jr.; William H. Page, II

[57] ABSTRACT

A process is disclosed for driving a turbine, which preferably is connected to an electrical generator, using energy supplied by the reboiler system of a fractionation column. The portion of the bottoms liquid of the column which is to be recycled through the reboiler is pressurized by a pump, and the high pressure liquid is heated and vaporized or brought to a supercritical state in the reboiler. The resultant high temperature stream is then depressurized through the turbine down to the desired pressure and temperature of the vapor stream used to reboil the column. The process is an extremely efficient method of generating electrical energy in a petroleum refinery or petrochemical installation.

12 Claims, 1 Drawing Figure

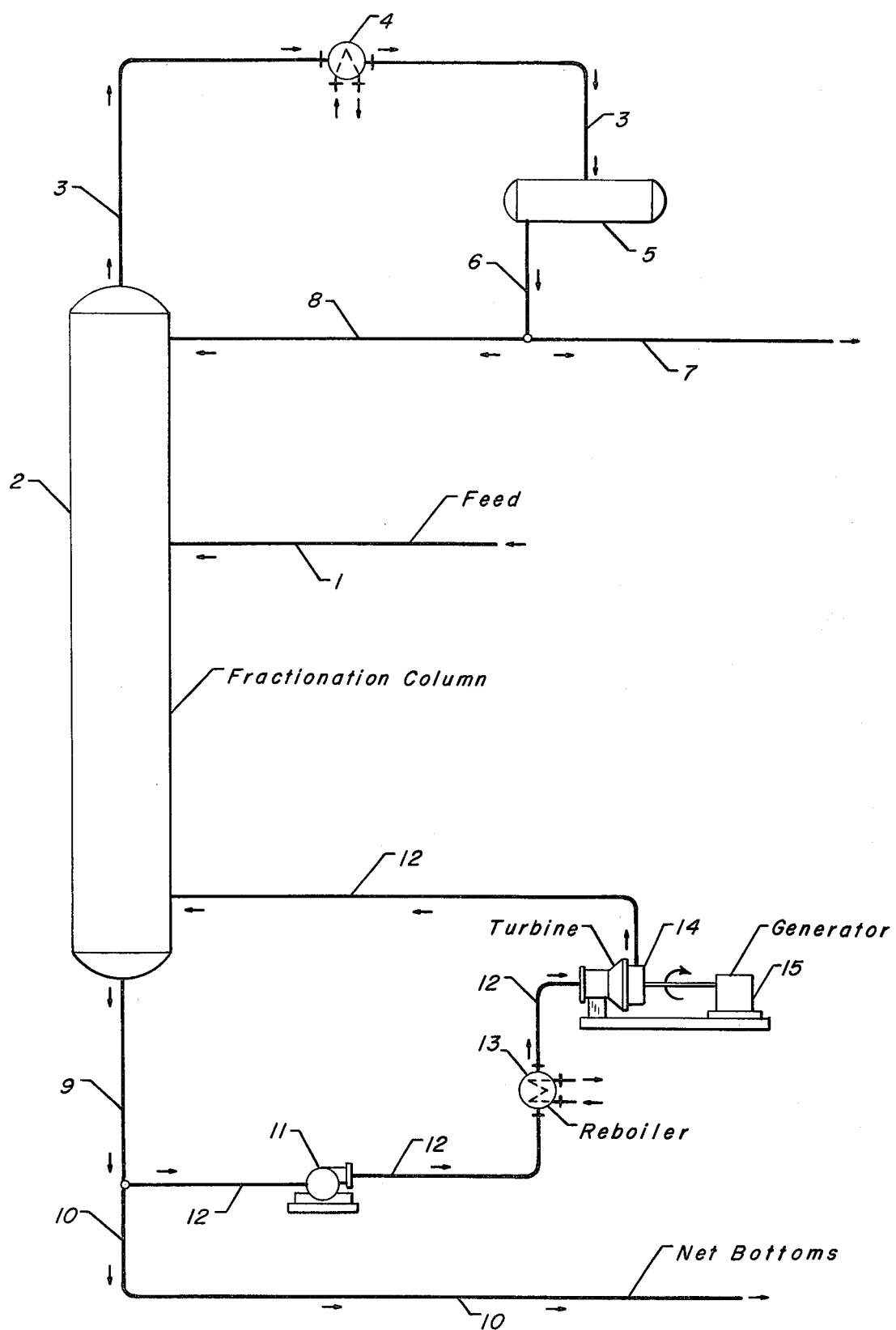

ELECTRICAL POWER GENERATION BY FRACTIONATION COLUMN REBOILER

FIELD OF THE INVENTION

The invention relates to a process for generating useful mechanical power by passing a working fluid through the sequential steps of pressurization, heating, vaporization or elevation to a supercritical condition, depressurization through a turbine and condensation. The invention also relates to a process for generating electrical energy in a petroleum refinery or petrochemical complex in which the reboiler of a fractionation column is utilized as a heat source in the power generation cycle. The inventin is specifically directed to a high efficiency process for generating electricity in which a portion of the bottoms liquid of a fractionation column is employed as the working fluid of a power generation cycle, with the vapor phase stream produced by the reboiler of the column being depressurized and cooled by passage through a turbine before the vapor stream is passed into the bottom of the fractionation column for the purpose of supplying heat to the fractionation column.

PRIOR ART

Fractionation columns are employed in essentially all petroleum refineries and petrochemical complexes to separate volatile chemical compounds by fractional distillation. Heat is supplied to the bottom of the fractionation column to produce vapors which rise through the column by the use of an indirect heat exchange means which is referred to as a reboiler. The reboiler may be stabbed into the bottom of the fractionation column proper but is more typically located outside of the column. With an external reboiler a liquid stream referred to as the bottoms liquid stream may be withdrawn from a lower portion of the fractionation column and divided into a first portion which is removed from the process as a product stream referred to as the net bottoms stream and a second portion which is passed into the reboiler for partial or total vaporization. The portion of the bottoms liquid stream which has passed through the reboiler is then returned to the bottom portion of the fractionation column. This manner of operation is well known to those familiar with fractionation processes. Alternatively, the liquid to be passed into the reboiler may be drawn off as a separate bottoms stream as shown in U.S. Pat. No. 2,580,651.

U.S. Pat. No. 4,109,469 is direceted to a process for power generation from petroleum refinery waste heat streams. A waste heat stream is a process stream which is at an elevated temperature which is normally considered too low for the commercially economical usage of significant quantities of its heat content within the process. That is, although this stream is at an above ambient temperature, it is not hot enough to serve as a useful heating medium within the process or to generate steam having a useful pressure. This reference is pertinent for its showing that a working fluid may be vaporized using heat available in a petroleum refinery and that the working fluid vapor stream may then be depressurized through a turbine to generate electricity.

BRIEF SUMMARY OF THE INVENTION

The subject invention provides a very high efficiency topping cycle which may be used to generate electrical power in any industrial facility utilizing a fractionation column having a fairly clean and vaporizable bottoms liquid. The subject process has the advantages of requiring only a minimal amount of capital expenditure for additional process equipment and of being able to generate electricity at very high efficiency in terms of required BTU's per kilowatt of produced electricity. In the subject process, a stream of bottoms liquid of a fractionation column which is passed through an external reboiler is utilized as a working fluid of a power generation cycle. The bottoms liquid is first increased in pressure by a pump and is then heated and vaporized, or elevated to a supercritical condition, to produce a working fluid stream having a temperature and pressure substantially above that desired and maintained in the bottom of the fractionation column. This stream is then passed through a turbine in which it is expanded, with this expansion reducing both the pressure and temperature of the stream down to the conditions employed at the bottom of the fractionation column. The subject process enjoys a very high efficiency since a very high percentage of the incremental energy, above that required to properly reboil the fractionation column, goes directly into the vaporization of the working fluid, and also because there is a very low percentage of energy expended within the process for the condensation of the working fluid vapor or the preheating of the working fluid liquid beyond that which is normally required in a fractionation process.

One very broad embodiment of the subject invention may be characterized as a process for generating useful mechanical power which comprises the steps of passing at least a portion of a liquid stream removed from a lower portion of a fractionation column through the reboiler means associated with the column and which is operated at a significantly higher pressure than the fractionation column and thereby forming a reboiler effluent stream; depressurizing the reboiler effluent stream in a turbine and thereby recovering useful mechanical power and also producing a turbine effluent stream having a lower temperature and pressure than the reboiler effluent stream; and passing the turbine effluent stream into the fractionation column as the vapor phase stream which supplies the heat input to the bottom of the fractionation column required to reboil the fractionation column. The process is preferably employed using a bottoms liquid stream comprising hydrocarbonaceous compounds which are totally vaporizable and which produce a vaporized or supercritical stream suitable for passage through a turbine.

DESCRIPTION OF THE DRAWING

The Drawing illustrates the preferred embodiment of the process. This is not intended to preclude from the scope of the subject invention those other embodiments set out herein or which are the result of normal and expected modification of the subject process by those skilled in the art. The Drawing has been simplified by the deletion of many minor accouterments which are normally present in a fractionation process including fractionation trays, temperature control systems, pressure control systems, flow control systems, etc.

Referring now to the Drawing, the fractionation column 2 serves as an LPG (liquefied petroleum gas) splitting column and receives a fractionation column feed stream from line 1 comprising a mixture of various hydrocarbons containing three and four carbon atoms per molecule. The lighter components of the feed stream are driven upward and are removed as part of the overhead vapor stream carried by line 3. The overhead vapor stream passes through the overhead condenser 4 and then enters the overhead receiver 5. Any uncondensed gases may be removed from the overhead receiver 5 through a line not shown. The liquid phase overhead condensate is withdrawn through line 6 and is divided into a net overhead product stream removed from the process through line 7 and a liquid phase reflux stream returned to the process through line 8. The overhead system of the fractionation column is therefore operated in a manner consistent with the prior art of fractional distillation.

A bottoms liquid stream is removed from the bottom of the fractionation column is line 9. Preferably this stream has a very high concentration of $C_4$ hydrocarbons with substantially all of the $C_3$ hydrocarbons which enter the fractionation column being concentrated into the overhead streams. The bottoms liquid stream carried by line 9, which is also referred to herein as the total bottoms liquid stream, is divided into a first portion which is withdrawn from the process through line 10 as the net bottoms stream and a second portion which is transferred through line 12. The portion of the bottoms liquid stream flowing through line 12 is first pressurized by a pump 11 to a pressure substantially above that maintained in the bottom of the fractionation column. The thus-pressurized bottoms liquid in line 12 is then heated and vaporized or elevated to a supercritical condition in the reboiler 13 to form a relatively high temperature and high pressure reboiler effluent stream which is passed into the turbine 14. The reboiler effluent stream is depressurized in the turbine, which results in a reduction in both the temperature and pressure of this stream. The effluent stream of the turbine is then passed into a lower portion of the fractionation column through line 12 to supply heat to the bottom of the fractionation column. The rotational mechanical energy produced in the turbine by the depressurization of the reboiler effluent stream is transferred to an electrical generator 15 which produces electricity for use within the process or in another part of the industrial complex containing the fractionation column.

DETAILED DESCRIPTION

A very large amount of energy is consumed in petroleum refineries and petrochemical plants due to the high temperatures and pressures which are involved in a great many of the processes performed in these facilities. A very significant amount of this energy is consumed in the operation of the fractionation columns employed to separate two or more volatile chemical compounds. The high cost of energy has prompted those skilled in the art to make a long and continuing effort to economize the operation of fractionation columns by reducing the amount of energy which is required to operate the column or by recovering any available useful energy in the process. One approach taken by those skilled in the art has been the development of cogeneration schemes in which the operation of a petroleum refinery or other industrial facility is tied to a public utility plant or in which two different industrial facilities are linked together, with an energy-containing stream being transferred between the two facilities for the purpose of maximizing the utilization of the energy content of these streams. For instance, in one such scheme, steam is depressurized in a turbine in an electrical utility to generate electricity and the low pressure steam is then transferred to a refinery wherein it is used as a heating medium with the condensate formed in this manner being returned to the utility. This allows the refinery to utilize the latent heat of vaporization of the steam in a useful manner and reduces the cooling cost to the utility. Another common practice is to recover the available heat in the net bottoms stream of a fractionation column by utilizing the net bottoms stream to heat another process stream or to generate low or moderate pressure steam.

The subject invention differs from these just-described energy recovery methods in that it is not an energy recovery method seeking to maximize the energy recovery in a process. Rather, the subject process is a method of generating useful mechanical energy at a very high efficiency by the utilization of the reboiler system of a fractionation column. Therefore the subject invention involves the highly efficient utilization of incremental amounts of energy above that required for the operation of the fractionation column. The subject invention is therefore more properly classified as a power generation method or topping cycle rather than an energy recovery method.

The conventional method of generating a vapor for the purpose of producing electrical energy by depressurizing the vapor in a turbine is a two-step operation. First, the working fluid which is to be vaporized is heated in an apparatus referred to as a preheater. It is preferred that substantially no vaporization of the working fluid occurs in the preheater and that the effluent stream of the preheater is a liquid phase stream. The function of the preheater is to raise the temperature of the liquid phase working fluid to the temperature at which it is passed into a downstream heat exchange apparatus referred to as a vaporizer. The vaporizer may be characterized in that a very great majority, that is in excess of 60–75%, of the energy fed to the vaporizer is utilized to vaporize the working fluid and is therfore absorbed by the working fluid as latent heat rather than as sensible heat such as is transferred to the working fluid in the preheater.

The highest efficiency which is theoretically possible to obtain in a power cycle such as described herein is given by well known Carnot cycle efficiency expression. The maximum theoretical efficiency is therefore dependent on the temperatures employed in the process. The actual efficiency of any power generation process is always well below the theoretical maximum efficiency due to a large number of factors. These efficiency-reducing factors include heat losses from the system, frictional losses in the fluid transfer system, inefficient power conversion in the turbine used in the system, the energy required for pumping the working fluid, and the fact that no working fluid is a perfect working fluid. The efficiency of a power generating process in which heat is converted to electricity may be measured in terms of the number of BTU's which are required to generate a kilowatt or kilowatt-hour of electrical energy. A high efficiency process will require a lower number of BTU's to generate the same amount of electrical energy as a less efficient process.

In the subject process the incremental amount of heat added to the process for the purpose of power generation is substantially lower than the heat which would be required by a conventional preheater-vaporizer system such as is employed in a public utility to generate the same amount of power. The power conversion efficiency of the subject process is therefore significantly higher than that of a conventional power generation cycle. However, it must be noted that this increased efficiency is obtained only with respect to the incremental amount of heat which is added to the bottom system of the fractionation column as part of the power generation feature of the process. The energy required for the operation of the fractionation column and which is transferred to the fractionation column by the reboiler means remains the same and is not included in the calculation of the efficiency of the power generation cycle.

The high efficiency of the subject process is due in part to the fact that the remaining enthalpy in the turbine effluent vapor stream is utilized within the fractionation column. That is, the enthalpy available in the effluent of the vapor stream should be equivalent to the desired heat input to the bottom of the fractionation column. It is therefore not necessary to waste energy in a cooler or condenser to condense this vapor as in conventional power generation processes. The cooling required to condense the vapor phase turbine effluent is the cooling normally supplied to the fractionation column by the overhead condensing system of the column. Reference may be made to the Drawing, which illustrates all the working components required for the successful operation of the process, to appreciate the fact that the efficiency of power generation in the subject process is not degraded by the customary energy inefficiency factors associated with condensing the effluent of the turbine. The absence of additional coolers and condensers also decreases the required capital expenditures necessary to practice the subject invention as compared to conventional prior art processes.

In the operation of a fractionation column, a liquid stream is removed from the bottom or from near the bottom of a fractionation column. This stream is referred to as the bottoms stream or bottoms liquid of the column. As used herein, the terms "the bottoms liquid stream" or "total bottoms liquid stream" are intended to indicate the total flow of the liquid material which is removed from the bottom of the fractionation column. This is the stream which flows through line 9 of the Drawing. The term "net bottoms stream" is intended to indicate the much smaller product stream which is withdrawn from the process and which is equivalent to the stream carried by line 10 of the Drawing. The total bottoms liquid stream therefore comprises both the net bottoms stream and an additional amount of bottoms liquid which is recirculated to the fractionation column through a reboiler means. In an alternative flow not shown on the Drawing the bottoms liquid stream which is passed into the reboiler is withdrawn separately from the fractionation column rather than being divided off the precursor of the net bottoms stream.

In prior art fractionation methods, the portion of the bottoms liquid stream which passes through the reboiler is not pressurized or is pressurized to only a very limited extent needed for circulation and flow control. For instance, it is customary to allow the reboiler portion of the bottoms liquid stream to simply flow into the reboiler due to a hydraulic driving force caused by a lower liquid level being maintained in the reboiler. The lower liquid level is the result of the vaporization of liquid previously entering the reboiler. This type of external reboiler is referred to as a thermosiphon reboiler. It is also known that a pump could be utilized to positively circulate the reboiler portion of the bottoms liquid stream through the reboiler. In this instance, the effluent stream of the reboiler may be a mixed phase stream of vapor and liquid. The elevated pressure imposed on the reboiler liquid in this positive circulation mode of operation is normally only that sufficient to achieve the desired circulation.

The subject process differs significantly from these prior art operating procedures in that the portion of the bottoms liquid stream which is passed into the reboiler is pressurized to a significant extent before entering the reboiler. This increase in pressure provides the pressure differential which is later imposed across the turbine. The portion of the bottoms liquid stream which enters the reboiler should be pressurized by at least 100 psig above the pressure being maintained at the bottom of the fractionation column as part of the normal operation of the column. It is preferred that this reboiler portion of the bottoms liquid is pressurized at last 150 psig and more preferably by at least 250 psig above this reference pressure. These pressures should be regarded as minimum pressures, with the maximum pressure being limited only by the structural limitations of the process components and the economic optimization of a practical process design.

Another significant difference between the subject process and the prior art is the significant additional heating which occurs in the reboiler means in the subject process. In a customary prior art reboiler, the entering bottoms liquid is merely vaporized and only to a minor extent is it increased in temperature. In the subject process, there is a very significant and intentional increase in temperature of the fluid passing through the reboiler. The reboiler effluent vapor stream should be at least 20 Centigrade degrees warmer than the fractionation column bottoms liquid being withdrawn from the fractionation column. It is preferred that the reboiler effluent stream is at least 30 Centigrade degrees warmer than the bottoms liquid temperature and more preferably the reboiler effluent stream is at least 40 Centigrade degrees warmer than the bottoms liquid of the column. As with the pressure elevation of the reboiler effluent, the temperature elevation of the reboiler effluent is limited only by the constraints imposed by practical and economical operation of the process and the temperature of the reboiler effluent vapor stream may therefore exceed the temperature being maintained in the bottom of the fractionation column by 100 Centigrade degrees or more. The reboiler effluent may be either a vapor phase stream or a stream of a supercritical fluid.

A further difference between the subject process and the prior art resides in the composition of the working fluid employed in the process. The working fluid of a power generation cycle is the fluid which is vaporized and/or compressed and then passed through a turbine in which it is depressurized to generate the rotational power recovered from the process. In the subject process, the working fluid is the recycle portion of the bottoms liquid which passes through the reboiler. That is, a separate working fluid different from the liquid present in the column is not employed in the process.

Since the reboiler effluent passes through the turbine, the subject process is best suited for use in fractionation systems in which the bottoms liquid of the column is relatively clean, free from solid particles and may be elevated to reasonable temperatures without significant thermal degradation. The subject process is therefore believed not suitable for utilization on the bottom of crude oil fractionation columns or crude oil vacuum fractionation columns but could be employed in the fractionation of such distillates as diesel fuel, jet fuel or light gas oils. It is preferred that the bottoms liquid stream is substantially free of any hydrocarbonaceous compound having a boiling point, as determined by the appropriate ASTM distillation, method above about 550° F. It is especially preferred that the bottoms liquid stream and working fluid employed in the subject process is a relatively light hydrocarbon and that this stream is rich in a hydrocarbon containing from 3 to 8 carbon atoms per molecule or is rich in a mixture of such hydrocarbons. The bottoms liquid and working fluid may therefore comprise propane, normal butane, isobutane, butylenes, pentanes, amylenes, hexanes, octanes, benzene, toluene, ethylbenzene, xylene, and cyclohexane. Although the use of these lighter hydrocarbons is preferred, the subject process may be utilized with a bottoms liquid having a heavier composition such as a naphtha or similar gasoline boiling range material. The bottoms liquid stream and working fluid is not limited to being a hydrocarbon and the subject process may be applied to the fractionation of other chemical compounds including alcohols, aldehydes, ethers, and various inorganic compounds including halogenated compounds or amines utilized as solvents or absorbents.

The subject invention has been characterized mainly from the viewpoint of utilizing the rotational energy delivered by the turbine for the purpose of generating electrical energy. However, the rotational energy delivered by the turbine may be employed for other purposes. The turbine could be connected to a pump, compressor, or essentially any other piece of rotating mechanical equipment which may be practical in the particular circumstances of the process. Another embodiment of the subject process may accordingly be characterized as a process for driving a turbine which comprises the steps of pressurizing at least a portion of a liquid stream removed from a lower portion of a fractionation column to a pressure at least 100 psig higher than the operating pressure at the bottom of the fractionation column and thereby forming a high pressure liquid stream; heating the high pressure liquid stream to thereby form a high temperature fluid stream, which may be either a vapor or a supercritical fluid, having a temperature at least 20 Centrigrade degrees higher than the operating temperature at the bottom of the fractionation column; driving a turbine by depressurizing the high temperature fluid stream through the turbine, and thereby forming a turbine effluent vapor stream; and passing the turbine effluent vapor stream into a lower portion of the fractionation column as at least a portion of the reboiler effluent passed into the fractionation column for the purpose of adding heat to the bottom of the fractionation column. The subject process may be used in conjunction with one or all of the reboilers used on a multiple reboiler column.

It is preferred that the effluent of the reboiler is free of liquid-phase material. If liquid is or may be present in the fluid stream exiting the reboiler, then this fluid stream is preferably passed into a vapor-liquid separation zone designed to remove this liquid from the fluid stream. If such a separator is employed then the vapor-phase stream being removed from the separator is intended to be considered the reboiler effluent stream of the subject invention. When the fluid stream exiting the reboiler contains only a limited amount of liquid it may be possible to operate the process without a vapor-liquid separator if the turbine can accept a multi-phase working fluid feed stream.

The operation of the subject invention is illustrated in the following example which is based on an LPG splitter column. The column receives a feed stream having a flow rate of about 81,000 lb/hr and comprising a mixture of $C_3$ and $C_4$ hydrocarbons. A net overhead stream comprising $C_3$ hydrocarbons and having a flow rate near 45,700 lb/hr is removed from the overhead system of the column. A net bottoms stream which is rich in $C_4$ hydrocarbons is removed from the bottom of the column as a second product stream having a flow rate of 35,300 lb/hr. When the subject invention is not employed, a portion of the bottoms liquid enters the reboiler at a temperature of about 210° F. (99° C.) and a pressure of about 255 psig, which is approximately the same as the temperature and pressure maintained in the bottom of the column. This bottoms liquid is vaporized to produce a reboiler vapor stream having a flow rate of approximately 354,600 lb/hr which is passed directly into the lower portion of the column. This requires a reboiler duty of about 32.35 million BTU/hr which may be provided by steam having a pressure of about 149 psig or by the combustion of a fuel in the reboiler. When the process of the subject invention is performed, this operation is modified to yield the following calculation results. The portion of the bottoms liquid passed into the reboiler means is presurized in a pump to a pressure of about 500 psig. This stream is then heated and vaporized as by indirect heat exchange against the same 149 psig steam, with the total heat duty of the reboiler being increased to near 34.85 million BTU/hr. The flow rate of the reboiler effluent stream is reduced to approximately 338,400 lb/hr but the temperature of this vapor stream is increased compared to prior operation to a temperature of about 275° F. (135° C.). This vapor stream is then depressurized to the operation pressure of the column through a turbine connected to an electrical generator which delivers about 551 net kilowatt-hours of electricity, assuming an 85% efficiency factor for the turbine-generator, after allowance for operation of the pump used to pressurize the bottoms liquid. Electrical power is thus produced at a cost or efficiency value of about 4540 BTU/kilowatt. This illustrates the very high efficiency of the subject process as compared to the efficiency of commercial electrical generating plants which typically ranges between 9,000 and 12,000 BTU/kilowatt-hr of electricity produced.

I claim as my invention:

1. A process for generating useful mechanical power which comprises the steps of:
    (a) passing at least a portion of a liquid stream removed from a lower porton of a fractionation column through a reboiler means operated at a significantly higher pressure than the fractionation column and thereby forming a reboiler effluent stream;
    (b) depressurizing the reboiler effluent stream in a turbine and thereby recovering useful mechanical power and also producing a turbine effluent stream; and,
    (c) passing the turbine effluent stream into the fractionation column to thereby reboil the fractionation column.

2. The process of claim 1 further characterized in that the mechanical power recovered from the turbine is used to operate an electrical generator.

3. The process of claim 1 further characterized in that the bottoms liquid stream is substantially free of any hydrocarbonaceous compound having a boiling point above above about 550° F.

4. The process of claim 1 further characterized in that the bottoms liquid stream is rich in a $C_3$ to $C_8$ hydrocarbon.

5. The process of claim 1 further characterized in that the reboiler effluent stream has a temperature at least 20 Centigrade degrees above the temperature of the turbine effluent stream.

6. A process for driving a turbine which comprises the steps of:
 (a) pressurizing at least a portion of a liquid stream removed from a lower portion of a fractionation column to a pressure at least 100 psig higher than the operating pressure at the bottom of the fractionation column and thereby forming a high pressure liquid stream;
 (b) heating the high pressure liquid stream to thereby form a high temperature fluid stream having a temperature at least 20 Centigrade degrees higher than the operating temperature at the bottom of the fractionation column;
 (c) driving a turbine by depressurizing the high temperature fluid stream through the turbine, and thereby forming a turbine effluent stream; and,
 (d) passing the turbine effluent stream into a lower portion of the fractionation column.

7. The process of claim 6 further characterized in that the liquid stream removed from a lower portion of the fractionation column is substantially free of any hydrocarbonaceous compound having a boiling point above about 550° F.

8. The process of claim 6 further characterized in that the bottoms liquid stream is rich in a $C_3$ to $C_8$ hydrocarbon.

9. The process of claim 6 further characterized in that the rotational energy delivered by the turbine is used to generate electricity.

10. The process of claim 6 further characterized in that the high temperature fluid stream has a temperature at least 30 Centigrade degrees above the temperature of the liquid stream removed from the fractionation column and a pressure at least 150 psig above the operating pressure at the bottom of the fractionation column.

11. The process of claim 10 further characterized in that the high pressure liquid stream is vaporized and heated in the reboiler of the fractionation column.

12. The process of claim 11 further characterized in that the high pressure liquid stream is brought to a supercritical state within the reboiler of the fractionation column.

* * * * *